United States Patent [19]

Detroit

[11] 4,181,652

[45] * Jan. 1, 1980

[54] OZONATED LIGNOSULFONATES

[75] Inventor: William J. Detroit, Schofield, Wis.

[73] Assignee: American Can Company, Greenwich, Conn.

[*] Notice: The portion of the term of this patent subsequent to May 9, 1995, has been disclaimed.

[21] Appl. No.: 875,854

[22] Filed: Feb. 7, 1978

Related U.S. Application Data

[63] Continuation-in-part of Ser. No. 697,541, Jun. 18, 1976, Pat. No. 4,088,640.

[51] Int. Cl.$^2$ ............................................... C07G 1/00
[52] U.S. Cl. ............................................... 260/124 R
[58] Field of Search ........................................ 260/124

[56] References Cited

U.S. PATENT DOCUMENTS

| | | | |
|---|---|---|---|
| 2,782,215 | 2/1957 | Smith et al. | 260/124 |
| 2,935,473 | 5/1960 | King et al. | 260/124 |
| 3,121,709 | 2/1964 | Englemann | 260/124 |
| 3,168,511 | 2/1965 | King et al. | 260/124 |
| 3,388,061 | 6/1968 | Markham | 260/124 |
| 4,001,202 | 1/1977 | Dilling et al. | 260/124 |
| 4,047,567 | 9/1977 | Childs et al. | 260/124 R |
| 4,069,217 | 1/1978 | Detroit et al. | 260/124 |
| 4,088,640 | 5/1978 | Detroit | 260/124 |

*Primary Examiner*—Delbert R. Phillips
*Attorney, Agent, or Firm*—Robert P. Auber; Ira S. Dorman; George P. Ziehmer

[57] ABSTRACT

Valuable new and widely useful compositions of matter are comprised of products having enhanced solubility and increased dispersant and the like surfactant activity which products are ozonated lignosulfonate derivatives beneficially including ozonated units of alkaline oxidized, hydrolyzed lignosulfonates, including sulfonated, partially desulfonated and resulfonated lignosulfonates.

39 Claims, 1 Drawing Figure

OZONATED LIGNOSULFONATES

BACKGROUND OF THE INVENTION:

This application is a continuation-in-part of my copending application Ser. No. 697,541 filed June 18, 1976 U.S. Pat. No. 4,088,640 entitled "OZONATED LIGNOSULFONATES".

Various and numerous sulfonated and otherwise derived lignin materials have already been found, known and developed and advantageously applied for many useful and beneficial purposes.

Numerous references are available dealing in one way or another with the identity and nature of lignin, per se, and many of the derivatives of lignin, including lignosulfonates, and the preparation and numerous uses of these materials; thus, substantial information thereon may be found, by way of illustration, in U.S. Pat. Nos. 1,848,292; 2,371,136; 2,371,137; 2,491,832; 2,505,304; 2,576,418; 2,598,311; 2,800,449; 3,087,923; 3,156,520; and 3,726,850. Still additional art of interest is uncovered in U.S. Pat. Nos. Re. 18,268; 2,057,117; 2,104,701; 2,399,607; and 2,434,626.

Other patents of interest in this area include: U.S. Pat. Nos. 3,278,425; 3,167,523; 3,325,426; 2,935,473 and 4,006,779, and British Pat. No. 694,665. Copies of these patents are attached herewith.

Another excellent informational source in this area is the Bulletin (No. 131) published by AMERICAN CAN COMPANY of Greenwich, Connecticut 06830 (U.S.A.) entitled "Chemicals From Wood".

The lignosulfonates which are utilized as the starting materials in practice of and to obtain the novel ozonated compositions of the present invention are the treated or untreated spent sulfite liquors (i.e., containing the desired effluent lignosulfonate solids) obtained from wood conversion as the sulfite waste pulp liquor. These, as indicated, may be ozonated in the "as is" or whole liquor condition. Or, and oftentimes with advantage, they may be ozonated as a purified lignosulfonate material from or in which the sugars and other saccharide constituents have been removed and/or destroyed or, additionally, inorganic constituents have also been partially or fully eliminated. As a further alternative, the lignosulfonate material that is ozonated may be one of the desulfonated lignosulfonates (including substantially pure lignosulfonate compositions) which are generally obtained by catalytic -- frequently alkaline -- oxidation processes conducted under conditions of high temperature and pressure, oftentimes with accompanying hydrolysis.

Where alkaline oxidized, hydrolyzed, partially desulfonated lignosulfonates are utilized as the starting materials in practice of and to obtain the novel ozonated compositions of the present invention, they are usually most readily and conveniently obtained pursuant to the teachings of U.S. Pat. No. 2,491,832.

In this connection, the lignosulfonate material that is utilized for ozonization may be, and frequently with great benefit is, a resulfonated desulfonated lignosulfonate product of the type prepared according to the teachings and disclosures of the present Applicant's copending Application with another co-Applicant for U.S. Letters Patent entitled "SOLUBILIZED RESULFONATED LIGNOSULFONATES" having Ser. No. 671,397 which was filed Mar. 29, 1976 (wherein there are also described various of the lignosulfonate materials that are suitable to be ozonated in the practice of the present invention).

In general, the lignosulfonates are anionic polyelectrolytes with a relative molecular size usually on the order of 1,000 to 100,000 and from which the ozonated products are obtained according to the instant invention. They generally have an organic sulfonic sulfur, i.e., $-SO_3H$ content, calculated as percent sulfur by weight of broadly between about $\frac{1}{2}$ and about 15 wt. %. More advantageously for many purposes, this sulfur range is between about $1\frac{1}{2}$ or $1\frac{3}{4}$ and about 10 wt. %; while quite often it is preferable for the partially desulfonated lignosulfonate to contain from about 2 to about 8 wt. % of the combined sulfur which represents its appearance in the sulfonic form.

"Relative molecular size" as this term is employed herein, is a term well-known to those skilled in the art to which this invention pertains. A method for determining relative molecular size is described by Julius Benko, in *Measurement of the Relative Molecular Weight of Lignosulfonates by Diffusion,* Preprint of paper read before the Section of Physical Chemistry, American Chemical Society, New York, New York, September 1960. The diffusion technique employed in the determination of relative molecular size of the lignosulfonates described herein involves diffusion of the three-dimensional lignosulfonate, the relative molecular size of which is unknown, and a known standard, specifically 2-naphthalene sulfonic acid (2-NSA) in an aqueous saline solution in a concentration of 0.0225 mole in 0.1 mole of sodium chloride through a cellulosic diffusion cell membrane having a pore size average of 0.4 micron; illustratively, a Scheicher & Schuell membrane filter type A having a course 90 mm diameter. The lignosulfonate of unknown relative molecular size is also dissolved in a 0.1 molar NaCl solution. The 2-NSA standard and unknown are diluted and introduced into separate diffusion cells (of about 250 ml. having an internal diameter of 8 cm.) incorporating the identical diffusion membrane. Samples of the 2-NSA solution are taken over a period of three hours. Samples of lignosulfonates are recovered over a period of 20 hours to 24 hours. The concentration of the lignosulfonate sample for diffusion measurements may be varied between very wide limits without any bearing upon the results, but it is more convenient to use a concentration that results in a reliable reading of optical density during the course of a diffusion period. Optical density determinations are made on the dilute 2-NSA samples at 274 m$\mu$ and on the lignosulfonate unknown at 278-280 m$\mu$ and the percentage optical density calculated through the membrane for the times at which samples thereof are taken for determination.

The standard 2-NSA is used to evolve a diffusion cell constant using the following equation:

$$\lambda = \frac{\log{OD_I} - \log{OD_F}}{t \times \log_e}$$

wherein
$OD_I$ is the initial optical density (first sample);
$OD_F$ is the final optical density of the cell as determined using later samples (2nd amd 3rd samples);
t is the time in days; and
$\log_e = 0.43429$ The cell constants for cells of the type described hereinabove will be approximately 3.5 to 4.0.

The diffusion rate coefficient for the lignosulfonate unknown is determined as follows:

$$\gamma = \frac{\log^{ODI} - \log^{ODF}}{t \times \log_e}$$

wherein $\gamma$ is the diffusion rate coefficient of the unknown; $OD_I$, $OD_F$, $t$ and $\log_e$ have the meanings ascribed above in calculation of the cell constants.

derived from softwood sulfite waste pulping liquors. MARASPERSE N-22 is considerably refined as to sugar and certain inorganic contents and MARASPERSE CB is a desulfonated spent oxidized liquor residue from a vanillin recovery process as taught in the above-identified U.S. Pat. No. 2,491,832.

As usually available, these commercial lignosulfonates generally have the following typical analysis and physical characteristics:

| TYPICAL ANALYSIS (Moisture-Free and Wt. % Basis): | | | |
|---|---|---|---|
| | "MARASPERSE C-21" | "MARASPERSE CB" | "MARASPERSE H-22" |
| pH-3% Solution | 7.0–8.2 | 8.5–9.2 | 7.5–8.5 |
| Total Sulfur as S, % | 6.8 | 2.6 | 7.3 |
| Sulfate Sulfur as S, % | 0.3 | 0.1 | 1.0 |
| Sulfite Sulfur as S, % | 0.09 | 0 | 0.12 |
| CaO, % | 5.2 | 0.03 | 0.55 |
| MgO, % | 0.3 | Trace | 0.3 |
| Na$_2$O, % | 6.1 | 9.9 | 13.2 |
| Reducing sugars, % | 1.5 | 0 | 0.8 |
| OCH$_3$, % | 7.9 | 12.7 | 7.7 |
| PHYSICAL CHARACTERISTICS | | | |
| Usual Form | Powder | Powder | Powder |
| Moisture Content (Max., % H$_2$O) | 7.5 | 8.0 | 7.0 |
| Color | Brown | Black | Brown |
| Bulk Density (lbs./cu. ft.) | 35–40 | 43–47 | 35–40 |
| Solubility in Water (%) | 100 | 100 | 100 |
| Solubility in Oils and Most Organic Solvents (%) | 0 | 0 | 0 |
| Surface Tension, 1% Sol'n (in dynes/cm) | ca. 49.4 | ca. 51.4 | ca. 52.8 |

The relative molecular size (RMS) of the lignosulfonate unknown is calculated by means of the 2-NSA Cell Constant ($\lambda$) and Unknown Diffusion Rate Coefficient ($\gamma$) as follows:

$$RMS = \frac{\lambda^2}{\gamma} \times mw_{(2\text{-}NSA)}$$

wherein mw is the molecular weight of 2-naphthalene sulfonic acid, that is 226.

The relative molecular size is then plotted against the percent optical density (OD) through the diffusion membrane and determined at 50 percent optical density through.

Relative molecular size is calculated at 50 percent optical density through. Duplicate cell constants are taken in accordance with the method employed herein and should check within 2.5 percent of the total. Duplicate relative molecular size values should also check within 10 percent of the total value at 50 percent optical density through.

The foregoing method, as indicated, is a standard well-known one further elaborated upon in a brochure available from the Marathon Division of American Can Company, Rothchild, Wis.

Many of the lignosulfonates that are advantageously ozonated according to the practice of the present invention are obtained in waste pulping liquors derived from a totally, or at least substantially, softwood source. However, excellent ozonated lignosulfonate products are also prepared from hardwood starting materials.

Good examples of lignosulfonate products of various types which are commercially available from AMERICAN CAN COMPANY include those bearing the trademarks, MARASPERSE C-21, MARASPERSE CB and MARASPERSE N-22. These are generally Another good lignosulfonate material (also commercially available from AMERICAN CAN COMPANY) is a hardwood lignosulfonate known as MARASPERSE (TM) N-42. This material has an analysis and characteristics generally quite analogous to those of MARASPERSE (TM) N-22 lignosulfonate. NORLIG (TM) 41 lignosulfonate, likewise commercially available from AMERICAN CAN COMPANY, is a still further illustration of a crude spent sulfite lignosulfonate material that is advantageously benefited in accordance with practice of the present invention (its typical analysis and characteristics being set forth in the above-identified Bulletin No. 131).

While the known lignosulfonate products, including such things as the above mentioned MARASPERSE materials, are good surfactant, dispersant, detergent and otherwise attractively-propertied materials that are commendable for a wide variety of uses, they still have certain intrinsic inadequacies and limitations in many crucial applications and for expanded applicability to many highly advantageous purposes. Noteworthy amongst these are difficulties in the employment of the aforementioned partially desulfonated lignosulfonates due to their relatively limited solubility in saline solutions and a limitation, sometimes and relatively, in their generally excellent surfactant properties.

FIELD AND OBJECTIVES OF THE INVENTION:

This invention pertains to and resides in the general field of ozonated or ozone oxidized lignosulfonates derivatives having greatly enhanced solubility, especially in saline environments and also having improved dispersant and surfactant properties. Amongst its principal aims and objectives are the provision of highly desirable ozone oxidized lignosulfonate products.

PARTICULARIZED DESCRIPTION OF THE INVENTION:

The compositions of this invention are, basically, ozone oxidized derivatives of the above-described and identified lignosulfonates. Besides their unique chemical constitution, they are characterized in having a solubility—especially as regards saline solution tolerance or compatibility—at least 10 percent and usually 2 to 3 or more times greater than that of the lignosulfonate starting material from which the ozonized products of the present invention are derived; and a substantially increased, i.e., at least 10-fold and in many cases up to 30–50 times, surfactant and dispersant activity.

The ozonated compositions are readily obtained by the direct ozone oxidation in alkaline media of the referenced lignosulfonate starting materials described herein. Ordinarily and most conveniently, this is done with ozone (present either in oxygen or air) in an aqueous alkaline solution of the starting material. Beneficially, mechanical agitation may be employed during the reaction (which augments by mechanical mixing or stirring the agitating effects of the oxidizing gas stream pressed into and passing through the reaction mass) at any desired suitable temperature. Because of the highly exothermic nature of the reaction, heating is literally never applied or necessary. In fact, especially to avoid as much as possible ozone hydrolysis and problems with material viscosity, cooling is generally necessary and employed (especially at the outset of the reaction). In general, the reaction can be conducted over a temperature range from about 0° C. to about 80° C., although it is ordinarily desirable to run it at the 20° C.–50° C. heat level. Ordinarily, a temperature on the order of 40° C.–50° C. is satisfactory for most of the ozonization done. This reaction is accomplished without requiring the use of pressure apparatus.

The time of reaction generally varies with the relative quantity of ozone in the gaseous reactant stream. When the reaction temperature is too high, especially under higher alkalinity conditions in the reaction mass, the ozone tends to hydrolyze to oxygen thus forfeiting the desired high oxidation potential in the reaction mass. Usually, depending on relative proportions of ozone employed, the ozonations can be completed in as little as ½ hour or so or may require as much as 16 or more hours for completion. When conducted at about 40°–50° C., the ozonization is usually completed within about 2 to about 7 hours, depending upon the rate of introduction or addition of the ozone, on a quantitative basis, to the reaction mass. In this connection it is generally preferable (and, from a pragmatic point of view, almost necessary for efficient production) to gradually admit and add the total quantity of ozone to be utilized for the lignosulfonate oxidation over the entire period of reaction at either a constant or incremental rate. Along this line, slower introduction of the ozone is generally more advantageous and tends to yield more beneficial and ordinarily better product. This is believed to be due to the avoidance thereby of oxidation conditions which may tend to be excessively harsh and destructive. Thus, at a reaction temperature of about 50° C., the time of reaction and rate of ozone feed for any given total quantity of ozone to be utilized is desirably adjusted to longer periods within the indicated ranges. Of course, and as is apparent from the foregoing, and appreciated by those skilled in the art, lesser quantities of ozone can be utilized in the reaction in shorter period of time.

A highly advantageous procedure for conducting the considerably exothermic reactions which are encountered is to start with the aqueous lignosulfonate mass at about room temperature before commencing the ozone feed (even if this involves pre-cooling of the reaction mass); then to pass in the ozone to commence the exothermic reaction with subsequent refrigeration or cooling being employed to maintain the reaction mass, without overheating run-away, at or within the desired range of temperature.

As indicated, the ozone employed for the oxidation may be generated by well known techniques, either in pure or substantially pure oxygen or in air (which, although generally not done can, if desired, be enriched with purposive additions of oxygen). Obviously, if desired, it can also be obtained from pre-generated and stored supplies contained in a carrier gas, such as a fluorocarbon, or the like even though this is generally a relatively expensive and inconvenient manner of furnishing the oxidizing agent.

Generally, ozone generated in oxygen requires handling of smaller gas volumes to feed to and pass through the reaction mass. In illustration of this, ozone generated and contained in air typically provides only half the amount of ozone per cubic foot of ozone-containing gas as compared to ozone in an oxygen medium. For example, if a given generator can provide 40 lbs. per day of ozone from and in oxygen it will be capable, generally, of yielding only about 20 lbs. per day of ozone from and in air. On the other hand, an advantage of utilizing ozone in air is the avoidance of recycling, for reasons of economy, to preclude a large loss of elemental oxygen which remains substantially pure after the large bulk of the ozone has been reacted therefrom. When air is employed for generation and carriage of ozone, the residual air after utilization of ozone in and for the reaction can ordinarily and without particular loss be directly vented to the atmosphere; usually requiring in this no more than a simple cleaning or scrubbing to remove residual traces of ozone as in and with potassium iodide or caustic solutions or any other alternative and equivalent reagent which oxidizes or hydrolyzes any escaping quantities of ozone in the escaping air stream.

The ozone concentration in the oxygen or air carrier can, for effective purposes, be as little as 0.1 or so wt.%, based on total gas composition weight, or as great as about 4 wt.% and indeed up to 5 wt. %. Ozone generating efficiency, however, normally tends to become relatively poor when higher ozone concentrations are involved; this being so in face of the general fact that the richer the ozone concentrations the more reactive and volumetrically efficient is the ozone-containing oxygen or air supply or stream that is employed. Thus, for maximum overall efficiency in utilization of total energy involved (taking into entire account that required for ozone generation plus that required for effecting the ozonization reaction) an ozone concentration of about 2 wt. % to about 3 wt. % is ordinarily, and on balance, more desirable.

In the practice of the present invention, all, or substantially all, of the total quantity of ozone employed is actually utilized in oxidizing attachment to the lignosulfonate being treated. In any case, all of one of the oxygen atoms in the strong oxidizing agent ozone molecule is utilized in the reaction along with approximately half of the oxygen atoms in the remaining oxygen molecule from the preliminarily reacted ozone. In the case of pre-oxidation with oxygen before ozone treatment only one oxygen atom of the ozone molecule reacts with the lignosulfonate. It is, of course, feasible, but significantly less preferred and uneconomic to utilize less than substantially all of the ozone reactant in the ozonization step.

Indicative of the foregoing is the typical reaction experience wherein, for example, 100 grams of unoxidized lignosulfonate is subject to oxidation with 9 grams of ozone. This usually results in the realization of from 104 to 106 grams of reacted lignosulfonate in the total solids obtained. Some of these solids can, in many instances, be comprised of an inorganic by-product such as sodium carbonate, for example, 1 wt.%, and indeed up to 10 wt.%. This by-product may result in the caustic environment from a part, e.g. ±1 gram, of the utilized ozone out of the 5 or 6 grams reacted causing and entering into demethylation reactions with the lignosulfonate material being oxidized.

Since there is no good way to titrate or analyze for reacted ozone, and C,H,O determinations in the oxidized lignosulfonate are exceedingly tedious and difficult, the gravimetric take-up or oxidized attachment from the ozone is generally measured by material balance techniques using the (almost invariably reliably accurate) assumption that all the utilized ozone has gone into the oxidized lignosulfonate product. The material balance also takes into account the ozone involved in solution. From this ozone balance combined molecular oxygen from the ozone can be easily calculated.

The lignosulfonate material being ozonated can be quantitatively treated over a relatively broad range to produce the enhanced compositions of the present invention. Ordinarily, very appreciable product amelioration is readily observable when the ozone take-up level in the lignosulfonate being oxidized is as little as about 2 wt. %, based on total lignosulfonate solids composition weight. As much as 20 wt. % of the ozone take-up can be accomplished to give, in most cases, very excellent quality product; although in such instances it is frequently necessary to recycle the ozone or wastefully employ excessive quantities of it for the reaction since at more highly oxidized lignosulfonate levels the reacting efficiency of the ozone diminishes and increasingly larger porportions of the ozone feed tend to by pass the reaction mass without actually oxidizing the lignosulfonate being treated. This phenomenon generally commences to occur at about the 9–10 wt. % take-up level, despite the fact that product efficacy is oftentimes very noticeably and greatly increasingly improved when the oxidation extent surpasses the indicated level. Advantageously, the wt. % take-up of ozone, based on total lignosulfonate solids weight, is between about 5 and about 15 wt. %, with 9–10 wt. % usually being a most advantageous range.

In a preferred embodiment of the invention, a continuous process is employed wherein the aqueous alkaline solution subject to ozonization is passed down a compartment or bubble cap column or a column packed with inert material such as Raschig rings, Berl saddles, beads, pulverized particulate matter formed of glass, ceramic or the like, countercurrent to the air or oxygen and ozone gas feed passed up through the column. The gaseous feed or stream depleted of ozone can be recovered as an off-gas at the upper end of the column and recycled with the generation of further ozone therein. Recycling is employed particularly where substantially pure oxygen, as opposed to air, constitutes the carrier gas for the ozone.

The alkaline medium of the reaction mass is an aqueous solution of an alkali metal or alkaline earth metal base or mixtures thereof, for example, carbonates, bicarbonates, amines and the like. Preferred are the hydroxides of the cations sodium, potassium, and calcium, as well as, lithium and to a lesser extent, strontium and barium. Significantly superior products are secured using sodium hydroxide, lithium hydroxide, postassium hydroxide or calcium hydroxide. Where the lignosulfonate is ozonized in an aqueous solution of calcium hydroxide, the ozonized lignosulfonate-containing product, in addition to the advantages otherwise provided by the invention, can be purified so as to be free of inorganic contamination. In this embodiment, all or substantially all of the carbonate, sulfate, and calcium inorganic contamination including calcium carbonate and calcium sulfate, are removed. This purity is obtained by treatment of the ozonized lignosulfonate product of the invention with sulfuric acid and sodium sulfate is a mole equivalent to calcium content at a pH of 3. Carbonate is removed as carbon dioxide gas. The precipitate that occurs, composed particularly of $CaSO_4$, is filtered off. The product which may be used effectively as a solution or dried, including spray dried, to powder form, is a significantly efficient, salt tolerant surface active agent and chelating or sequestering agent.

The alkaline medium of the reaction mass, generally achieved with a strong caustic or alkaline base such as sodium or potassium hydroxide, because of its economy and efficiency, or the foregoing calcium hydroxide, in which the ozonization is accomplished, should have a pH of at least above 7, and most desirably above 8, (and generally much more highly alkaline than that) to facilitate and accomplish the desired ozonization. This can be economically and effectively achieved by utilizing at least about 1 wt. % of base, e.g. sodium hydroxide NaOH, potassium hydroxide (KOH), ammonium hydroxide, $NH_4OH$, calcium hydroxide $Ca(OH)_2$, lithium hydroxide, $Li(OH)_2$ or strontium or barium hydroxide, in the aqueous reaction mass, based on the total weight of reaction mass involved, to as much as can be dissolved at the solubility limits of the caustic in the reaction mass. At any given desired level of free base or caustic in the reaction mass, the actual quantity to be employed may be increased in particular instances, especially when acid lignosulfonate is being treated due to the effects of neutralization of such material. Good results are ordinarily had when the reaction mass contains from about 10 wt. % to about 15 wt. % of caustic or other alkaline reagent as described herein based on the weight of lignosulfonate present with a desirable alkaline, for example, caustic, concentration being on the order of 13 wt. % (at which point the pH of the reaction mass is 14).

A pH of 8 to 14 is preferred in the formulated alkaline aqueous medium. Indeed, basicity in excess of that measured by a pH of 14 is also useful. Expressed as a percentage by weight of the reactant lignosulfonate or solids content to be ozonated, a concentration of 6 percent to 21 percent of base in water is desirable whereas from 10 percent to 20 percent of sodium hydroxide or calcium hydroxide by weight of lignosulfonate is more significantly preferred. Equivalent amounts of other alkali metal or alkaline earth metal hydroxides are similarly employed. Thus, a concentration of 6 percent to 9 percent of lithium hydroxide, or 15 percent to 21 percent potassium hydroxide can also be employed. The hydroxides of barium [Ba(OH)$_2$] and strontium [Sr(OH)$_2$] may be employed in these latter concentrations, but are materially less preferred.

While very desirable ozone oxidized lignosulfonate material are prepared with the aqueous reaction mass containing, on a weight percent basis, of from about 35 to about 45 (advantageously, approximately 40) wt. % of dissolved lignosulfonate solids, the lignosulfonate concentration utilized can be as little as 10 wt. % to as much as 60 wt. % solids content (excepting, due to good dissolution requirements, in the cases where partially desulfonated lignosulfonates such as "MARASPERSE CB" are being ozonated wherein approximately 40 wt. % is a practical upper limit). It should also be considered in this regard that greater dilution conditions tend to lead to more easy and extensive oxidation results probably due to thereby increased availability of the reacting molecules to the oxidizing influence of the applied ozone in the reaction mass.

While it is not intended to be bound by any particular theory, it is believed that the ozone oxidation of lignosulfonate conducted in accordance with the present invention actually involves two distinct types of reactions of the oxidizing oxygen with the reacting lignosulfonate. One of these goes relatively slowly and the other proceeds at a comparatively fast rate. The one reaction is a demethylation of the methoxyl units on the phenyl propane group in the lignosulfonate structure which splits out methyl entities. The other is the formation of carboxylic acid groups from the alcohol units in the lignosulfonate, the overall oxidation also forming phenolic groups in the lignosulfonate being treated. In some instances, the ozone oxidation may also tend to split the pino-resinol groups in the lignosulfonate structure to result in phenyl propane occurrences in the oxidized lignosulfonate product. Ordinarily, practice of the present invention does not result in any appreciable extent of desulfonation of the lignosulfonate being treated, especially if care is taken under the particular conditions of the involved reaction to avoid a too drastic effect of the alkaline reagent, such as caustic, present giving consideration to time and temperature factors along with the caustic concentration utilized.

Surprisingly enough, very attractive and frequently even further enhanced results can be achieved by additionally sulfonating or resulfonating (following, for example, the general procedure and teachings of U.S. Pat. No. 4,069,217) an already ozone oxidized sulfonated or desulfonated lignosulfonate product. When increased quantities of combined organic sulfonic sulfonate attachments are desired in such a doubly treated product, it is frequently more advantageous to after-sulfonate an already ozone oxidized material rather than to ozonize a resulfonated or additionally sulfonated lignosulfonate. In this way there is avoided any proclivity for possible desulfonation when a highly sulfonated lignosulfonate is exposed to ozone oxidation reaction conditions. In any event, the doubly treated lignosulfonate products quite frequently show an additional improvement, in particular, enhanced properties of as much as 1½ times, especially, in dispersant activity, and more than that which is evident in the solely ozone oxidized lignosulfonate material.

The additionally sulfonated or resulfonated compositions, including the alkaline earth metal and alkali metal salt derivatives thereof, are readily obtained by the direct sulfonation or sulfoalkylation of the referenced lignosulfonate starting material or the alkaline, ozone oxidized, hydrolyzed lignosulfonate intermediate. Ordinarily and most conveniently, this is done with appropriate sulfonating reagents in an aqueous solution of the starting material, advantageously using agitation during the reaction (which is better when applied vigorously and may be either by mechanical mixing or stirring and/or from the agitating effects of steam being passed into the reaction mass when steam is used for heating), at any desired suitable temperature. In general, the reaction can be conducted over a temperature range from about 50° C. to about 200° C., although it is ordinarily desirable to run at least at the boil (i.e., about 100° C. or so) in order to avoid unduly long reaction times. Ordinarily, a temperature on the order of 160° C. is satisfactory for most of the resulfonations done. Of course, the reaction is accomplished under corresponding pressure when temperatures over boiling are utilized. The time of reaction generally varies with the temperature involved; lower temperature requiring longer times. At higher temperatures the resulfonations can be completed in as little as ½ hour or so while temperatures at the lower end of the scale may require as much as 16 or more hours for completion. When conducted at about 160° C., the resulfonation cooking is usually completed within about an hour.

Any suitable sulfonation reagents may be used for the resulfonation reaction. When straight sulfonations are desired, they may be advantageously accomplished with an alkali metal (such as sodium) sulfite or sulfur dioxide. Sulfoalkylations, as are frequently quite desirable, are done with mixtures of an appropriate lower alkyl aldehyde and a bisulfite. The sulfonate group, per se, that is attached in straight sulfonation is, of course, —SO$_3$H. The sulfoalkylates, which ordinarily involve 1 to 3 carbon atom alkyl units, are of the structure —(CH$_2$)$_y$—SO$_3$H, wherein y is usually an integer from 1-4 and when y is plural the alkyl unit may be linear in attachment or, as is probably the most frequent case, comprised of side-chain arrangements. Sulfonation and sulfoalkylation are embraced herein by reference to attachment of groups of the formula —(CH$_2$)$_x$SO$_3$H, wherein x has a value of 0 to 3 inclusive.

The aldehyde utilized in at least approximately stoichiometric proportions with the bisulfite in the sulfoalkylations performed for the resulfonation is generally of the structure: RCH:O, wherein R is hydrogen or any desired 1-2 carbon atom-containing alkyl group. Obviously, if desired, mixed aldehyde reaction systems may be utilized even though there is ordinarily no particular advantage in this. Usually, it is very desirable to accomplish the resulfonation with sulfomethylating reaction using formaldehyde (CH$_2$O) and a bisulfite of the formula XHSO$_3$ wherein X is an alkali metal or an alkaline earth metal, and preferably sodium bisulfite (NaHSO$_3$), as reagents so as to make sulfomethyl (—CH$_2$SO$_3$H) attachments in the resulfonated product.

As indicated, about stoichiometric relative proportions of the aldehyde and bisulfite reagents are employed for the resulfonation; these being used in amounts calculated to effect the desired extent or quantity of sulfonic acid units in the finally obtained resulfonated product. Actually a plus or minus 20% tolerance from exactly stoichiometric ratios is tolerable. In sulfomethylating reactions, the amount of formaldehyde used may vary from about 1½ to about 12 wt. % of the desulfonated starting material being resulfonated while the bisulfite can correspondingly be utilized in quantities, on the same basis, of between about 5 and about 40 wt. %. A particularly desirable resulfomethylated product containing about 5½ wt. % of sulfur in organic sulfonic sulfonate form is obtained by the reaction in the described manner of "MARASPERSE CB" with about 15 wt. % of sodium bisulfite and 4½ weight % of formaldehyde, based on "MARASPERSE CB" weight, cooked for one hour at 160° C.

The resulfonated products of the present invention may, as desired, contain anywhere from about 1½ wt. % to 14-15 wt. % of total sulfur in combined organic sulfonic sulfonate form. Advantageously, the range of such sulfur is between about 2¾ and about 10 wt. %, with greater desirability oftentimes attained in the sulfur wt. % range of from about 4½ to about 6½ wt. %.

The following detailed examples more particularly delineate and show the extraordinary benefits and advantages obtained in and by practice of the present invention and with the exceptionally useful and versatile ozone oxidized composition products obtained thereby.

EXAMPLE 1

A sample of "NORLIG 41" crude spent sulfite lignosulfonate was employed for sulfomethylation followed by ozonation and, also and separately, unmixed ozonization. The "NORLIG 41" on a moisture-free basis, had (in wt. % based on total composition weight): a pH of 3.3 in 3% aqueous solution; total sulfur as S of 5.8%; sulfate sulfur as S of 0.1%; 5.1% of CaO; 0.3% of MgO; no $Na_2O$; 17.3% of reducing sugars; and 9.3% of $-OCH_3$ content containing in aqueous liquid form about 53% solids with a Brookfield viscosity at 77° F. of about 100 cps and, in powder form, about 6% water moisture content and a bulk density of 36 lbs. per cubic foot with a brown coloration to it.

Part of the liquid "NORLIG 41" was first sulfomethylated by cooking for one hour at 160° C. with 15 wt. % sodium bisulfite and 4½ wt. % formaldehyde (following on a reduced scale the general procedure of the First Illustration in the referred to copending Application). The resulting additionally sulfonated lignosulfonate material then contained about 10.8% of total sulfur in combined organic sulfonic sulfonate form, based on final solid composition weight.

The additionally sulfonated portion of the "NORLIG 41" and another untreated portion thereof were then ozonated by first adding about 13 wt. %, based on lignosulfonate solids content, of caustic soda (NaOH) to each of the lignosulfonate solutions; then passing a mixture of about 2 wt. % of ozone in oxygen with supplemental stirring at an average reaction temperature of 40°-50° C. for about 2 hrs. The rate of ozone admission was such that a weight increase due to oxidation of the lignosulfonates by the ozone of about 4 wt. % was had in each of the ozonated portions.

Salt tolerance tests in extremely high concentrations of synthetic aqueous saline solution were then performed on each of the ozonated lignosulfonate materials, using a Salt Tolerance Standard Test for the evaluations. In each, the salt solution is made up in water to a total volume of 1 liter and is composed, in the water, of 100 gms. of sodium chloride (NaCl), 12 gms. of calcium chloride ($CaCl_2$) and 8 gms. of magnesium chloride ($MgCl_2$). About 5 wt. % dispersant solutions of each of the ozonated lignosulfonate products being tested were prepared and the make-up manually shaken briefly to effect whatever preliminary dissolution could be achieved; after which it was put on a mechanical shaker for one hour to ensure as much solubilization as possible. Subsequent to that, a 10 ml. portion of each of the overall mixtures were placed into a graduated container tube from a standard laboratory-type DeLaval Centrifuge and centrifuged for 5 minutes thereon at 20,000 RPM. The volume percent of sludge found after the centifugation (based on original volume of centrifuged material) was then measured. For purpose of comparison, a sample of the non-ozonated additionally sulfonated "NORLIG 41" starting material was also tested.

The volume percentages of removed sludge after the centrifugations were: 9% for the non-ozonated but additionally sulfonated "NORLIG 41"; 5% for the straight and solely ozonated "NORLIG 41"; and 0.8% for the ozonated, additionally sulfonated "NORLIG 41".

Analogous results are obtained when the same saline solubility tests are repeated except that there is used, as the aqueous saline media; (i) 200 grams/liter NaCl solution; and/or "North Sea" water comprised, per liter, of 30.0 gms. NaCl, 1.16 gms. $CaCl_2$ and 5.54 gms. $MgCl_2$ (giving a total dissolved content of 36.70 gms./liter of such salts).

EXAMPLE 2

A sample (identified as "HWD-N") of a sugar-destroyed, 100% hardwood lignosulfonate in crude spent sulfite liquor form was obtained. Its analysis and characteristics were approximately comparable to that of a "MARASPERSE N-22" which was derived from a mixture of only 65% softwood with a hardwood balance for the pulping. Part of the "HWD-N" material was ozonated to the 9 wt. % level following the procedure of Example 1, this product being referred to as "HWD-N-$O_3$".

Each of the involved materials was then tested as a dispersant for Stellar clay according to the well-known, standard ASP-200 Stellar Clay Test using for the measurement a Fann Rotational Viscosimeter obtained from the Fann Instrument Company of Houston, Tex. Values for viscosity yield point, zero gel and Fann 600°, 300°, 200°, 6° and 3° settings were obtained. The data obtained as yield point represents the force required to move a stationary clay system through the plug flow to plastic flow condition in a pipe with the numerical measurements calculated in lbs./100 ft.$^2$ of pipe surface; lower readings indicating better dispersant effected by the additive as the consequence of requiring less force for the movement of the mixture through the apparatus. The results were as follows:

|  | "HWD-N" | "MARASPERSE N-22" | "HWD-N-$O_3$" |
|---|---|---|---|
| Apparent Viscosity* | 58 | 54 | 10 |
| Plastic Viscosity*** | 6 | 6 | 6 |
| Yield Point | 104 | **96 | **8 |

-continued

|  | "HWD-N" | "MARASPERSE N-22" | "HWD-N-O$_3$" |
|---|---|---|---|
| °Fann 600 | 116 | 108 | 20 |
| 300 | 110 | 102 | 14 |
| 200 | 104 | 99 | 12 |
| 100 | 94 | 95 | 10 |
| 6 | 63 | 74 | 6 |
| 3 | 56 | 58 | 6 |
| 0 Gel | 52 | — | 7 |

*Values for Apparent Viscosity appear in centipoises (cps) in each of the Examples hereof.
**It must be taken into account for result evaluation purposes that the Yield Point difference (i.e., 96 vs. 8) is extremely significant, as will be readily appreciated by those skilled in the art.
***Value in pounds per 100 square feet.

EXAMPLE 3

A number of experiments were performed involving oxidation of lignosulfonates with ozone. The ozone, absorbed in "FREON 13" carrier gas, was obtained in cylinders. The experimentation was for three purposes, including alteration of the lignin-lignosulfonate molecule to increase its effectiveness as a surface active agent. The experiments involved oxidation of hardwood liquors. The Method of Least Squares was utilized in a statistical evaluation of three variables on hardwood sodium "NORLIG 41" liquor. The variable included pH, ozone concentration and temperature. Evaluation was as dispersants for ASP-200 Steller clay. Eight experiments showed that pH and ozone concentration were critical variables. Using 5% ozone on hardwood spent sulfite liquor solids (i.e. SSL) gave a product six times more efficient on stellar clay than that attained with a "MARASPERSE N-22" material (65% softwood) and 7.5 times better than with "HWD-N"

type controls. Treatment with 15% ozone gave a product 14 times better than "MARASPERSE N-22".

The oxidation of ammonia base hardwood SSL with ozone (15%) also resulted in a product better than "MARASPERSE N-22" for Stellar Clay dispersion. The same was found to be true for a 5% ozonated calcium base "NORLIG 41".

The results obtained were as set forth in the following tabulation (with all percentages on a wt. % basis):

| Statistical Product Number | VARIABLES | | | ASP-200 Stellar Clay Yield Pt. lbs/100 ft.$^2$ | ASP-200 600° Fann Reading |
|---|---|---|---|---|---|
| | pH | O$_3$ Take-Up | Reaction Temp. °C. | | |
| 1 | 7 | 10% | 25 | 72 | 80 |
| 2 | 4 | 15% | 35 | 28 | 44 |
| 3 | 10 | 5% | 35 | 92 | 118 |
| 4 | 10 | 15% | 15 | 18 | 30 |
| 5 | 4 | 5% | 15 | 114 | 146 |
| 6 | 8% NaOH | 5% | 15 | 52 | 68 |
| 7 | 12% NaOH | 5% | 15 | 14 | 28 |
| 8 | 12% NaOH | 15% | 15 | 6 | 18 |
| Controls: | | | | | |
| "MARASPERSE N-22" | | | | 82 | 98 |
| "HWD-N" | | | | 104 | 116 |
| Non-statistical: | | | | | |
| NH$_3$ Base Hardwood SSL | 8% NaOH | 15% | 15 | 48 | 68 |
| Ca Base B-41 "NORLIG 41" | 8% NaOH | 5% | 15 | 42 | 54 |

Figure 1:
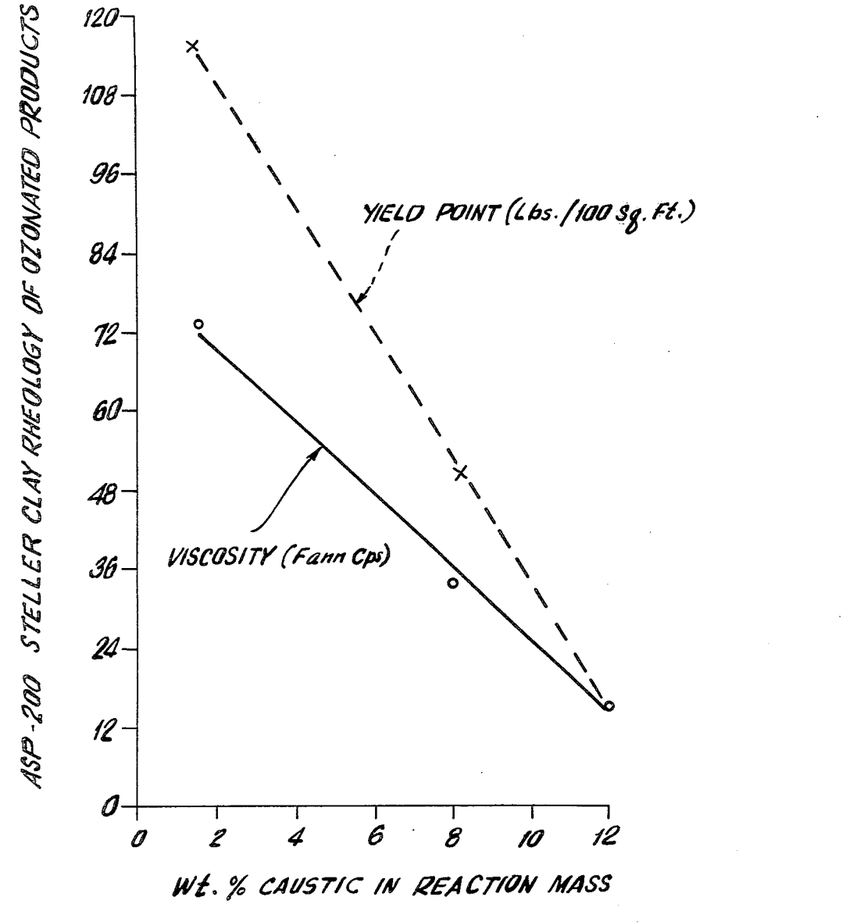
The FIGURE is a graph showing the flow properties of the ozonated products of the invention in relation to the alkaline concentration employed in ozonation of the lignosulfonate reaction product.

The Graph in the accompanying Drawing, derived and plotted from the foregoing data, more particularly illustrates the improvement in product properties with increasing quantities of caustic soda in the "NORLIG 41" lignosulfonate reaction mass being ozone oxidized to the 5 wt. % level at a 15° C. temperature of reaction.

EXAMPLE 4

Several series of different performance evaluations were made on various ozone oxidized and control products including a 9 wt. % ozone oxidized "HWD-N-O$_3$"; an alkaline (Kraft process) lignin material ozone oxidized to an approximate 10 wt. % O$_3$ take-up pursuant to the teachings of U.S. Pat. No. 3,726,850 which contained no sulfur and was soluble in aqueous media at pH levels below 5 (identified as "KRAFT O$_3$"); "HWD-N" as a control; "MARASPERSE N-22", identified for brevity simply as "N-22" as another control; and "MARASPERSE CB", identified for brevity simply as "CB", as yet another control for further comparative purposes in certain of the test instances.

The various standard and well-recognized tests made, and the observations and results obtained therein, are identified and set forth in the following tabulations, wherein all given percentages are on a weight basis:

I. Evaluation of Dispersions

| | 1. ASP-200 Stellar Clay Test (41% Solids) | | | | | |
|---|---|---|---|---|---|---|
| | % Dispersant (on Clay) | Apparent Viscosity | Yield Point | Fann 600° | Fann 3° | 0'Gel Strength |
| "N-22" Control | 0.126 | 97 | 158 | 194 | 75 | 65 |
| "HWD-N" Control | 0.126 | 103 | 170 | 206 | 74 | 65 |
| "HWD-N-O$_3$" | 0.126 | 16 | 20 | 32 | 20 | 24 |
| "HWD-N-O$_3$" | 0.084 | 67 | 108 | 134 | 66 | 61 |
| "KRAFT O$_3$" Control | 0.126 | 22 | 32 | 44 | 26 | 28 |
| CB control | 0.126 | 63 | 114 | 176 | 60 | 50 |

2. "IDEAL" Type I Cement Test (15% NaCl Sol'n) (68.5% Cement) 1% Dispersant on Cement

| | Apparent Viscosity | Yield Point | Fann 600° | Fann 3° | 0' Gel Strength | Retardation 1 hr | 2 hrs | 3 hrs | 20 hrs |
|---|---|---|---|---|---|---|---|---|---|
| "N-22" | 300+ | 300+ | 300+ | 10 | 8 | Thick | Thick | Thick. | Gelled |
| "HWD-N-$O_3$" | 90 | 34 | 180 | 5 | 5 | Fluid | Fluid | Fluid | Set |
| "KRAFT $O_3$" | 42.5 | 11 | 85 | 11 | 15 | Thick | Thick | Thick | Gelled |

3. Calcium Carbonate ("ATOMITE") 50% Slurry Test

| | % Dispersant on Solids | Brookfield Viscosity CPS | Fann Yield Point | Sediment (inches) |
|---|---|---|---|---|
| "N-22" | 0.25 | 130 | 3 | 0 |
| "HWD-N-$O_3$" | 0.25 | 27.5 | 1 | 0 |
| "HWD-N-$O_3$" | 0.125 | 125 | 5 | 0 |
| "KRAFT $O_3$" | 0.25 | 12.5 | 1 | 1/16" |

4. Titanium Doxide $TiO_2$ ("TITANOL") Slurry Tests

| | % Dispersant on Solids | Brookfield Viscosity, CPS | Fann VC Yield Point | O' Gel | Sediment (inches) |
|---|---|---|---|---|---|
| "N-22" | 0.25 | 450 | 9 | 6 | 0 |
| "HWD-N-$O_3$" | 0.25 | 7.5 | 1 | 0 | 0 |
| "HWD-N-$O_3$" | 0.125 | 490 | 10 | 7 | 0 |
| "KRAFT $O_3$" | 0.25 | 7.5 | 1 | 0 | 0 |

5. (A). Tests With Yellow Presscake No. 1 (American Aniline) And Eastone Blue GFD (Tennessee Eastman)

| | (*) Stain Evaluation | Yellow Presscake Oven 70° | Dried 95° | Eastone Blue GFD Dispersion | Heat Stability |
|---|---|---|---|---|---|
| "N-22" | 2 | Failed | Failed | Good | Failed |
| "HWD-N-$O_3$" | 1 | Passed | Passed | Good | Failed |
| "KRAFT $O_3$" | 3 | Excellent | Excellent | Good | Good |
| "GB" | 7 | Failed | Failed | Good | Good |

(*) Stain Rating:
0 - Best, No Stain
10 - Worst, High stain

5. (B) Additional Dye Evaluation Tests

| | Yellow Presscake (American Aniline) Oven 70° | Dried 95° | Eastman Blue GFD (Tennessee Eastman) Dispersion | Heat stability | Composite Standard Fabric Stain Test |
|---|---|---|---|---|---|
| "CB" | Failed | Failed | Good | Good | Poor |
| "N-22" | Failed | Failed | Good | Failed | Good |
| "HWD-N-$O_3$" | Good | Good | Good | Failed | Excellent |
| "KRAFT $O_3$" | Excellent | Excellent | Good | Good | Good |

II. Evaluation of Emulsions

1. Kerosene - 25% oil in water
Dispersant - 1% based on water phase

| Product | Temp., °C. | Foam, 2 min. (cm.) | Stability Evaluation Break (cm. at top) 30 min. | 1 hour | 4 hours |
|---|---|---|---|---|---|
| "N-22" | 26 | 1.3 | 0 | 0.7 | 2.0 |
| "HWD-N-$O_3$" | 27 | 0.4 | 0 | 0.2 | 0.8 |

2. Carbon Tetrachloride - 25% oil in water
Dispersant - 1% based on water phase

| Product | Temp., °C. | Foam 2 min. (cm.) | Stability Evaluation Break (cm. at top) 30 min. | 1 hour | 4 hours |
|---|---|---|---|---|---|
| "N-22" | 26 | 2.5 | 0.7 | 1.6 | Broke |
| "HWD-N-$O_3$" | 26 | 0.9 | 0.3 | 1.1 | Broke |

3. Nitrobenzene - 25% in water
Dispersant - 1% based on water phase

| Product | Temp., °C. | Foam 2 min. (cm.) | Stability Evaluation Break (cm. at top) 30 min. | 1 hour | 4 hours |
|---|---|---|---|---|---|
| "N-22" | 26 | 0.5 | 1.5 | 2.0 | 4.7 (Broke) |
| "HWD-N-$O_3$" | 26 | 0 | 0.1 | 0.2 | 0.4 |

EXAMPLE 5

An unneutralized aqueous solution (206.5 grams) of the calcium salt of a lignosulfonate-containing soft wood spent sulfite liquor, the soluble organic fraction resulting from acid sulfite pulping of wood and containing 49.2 percent by weight of said solution of solids, and from which, in addition, the reducing sugars were removed by the known yeast fermentation process, marketed by St. Regis Paper Company under the trade name TORANIL GATX 19127, was admixed with 16 grams of CaO solute (i.e. an aqueous suspension of 181 milliliters of 88.5 grams/liter of CaO). Sixty-four grams of water were then added to dilute the aforesaid spent sulfite liquor to a 30 percent concentration to provide a solution which was then introduced into conventional ozone treatment apparatus wherein the desired reaction time of 160 minutes was first determined and other reaction conditions rendered substantially constant; and the apparatus swept with ozone. Defoamer was initially added. Nine weight percent of ozone and 16 weight percent of CaO were used in this reaction. The reaction was carried out at about 75° C. and the ozone flow was 0.1015 grams per minute. Eighty milliliters of the CaO were added in increments of 40 ml. each on expiration of 78 minutes and the reaction with added CaO permitted to continue for an additional period of 35 minutes to sustain the alkaline state of the reaction mixture during ozonization.

The ozone employed in oxidation of the foregoing lignosulfonate composition was formed from oxygen on a corona discharge dielectric supplied with a line voltage of 120 volts that was transformed to about 19,000 volts at the dielectric. The power of the dielectric was held within the range of 198 to 220 watts. The ozone charged into contact with the lignosulfonate was effected at an indicated flow rate of 1.65 liters of oxygen per minute (1.5 l/m actual). Of this 1.265 to 1.275 liters per minute of ozone was vented from the reactor. The reaction temperature varied from 50° C. to 75° C. The oxygen pressure at the dielectric was 8 psi. The reaction was sustained for the projected period, as indicated, at an alkaline pH which at the conclusion of the reaction was reduced to 7.25. The yield of product, an aqueous solution of 469 grams containing 27 percent of lignosulfonate solids totalling 126.7 grams with a calculated CaO content of 18.53 percent by weight of solids content constituted as aqueous alkaline [Ca(OH)$_2$] solution of the ozonated calcium salt of sulfomethylated softwood lignosulfonate.

EXAMPLE 6

The process of Example 5 was repeated using 204 grams of the calcium hardwood sugar-destroyed lignosulfonate (B41 Norlig 41) having a pH of 4.45 in admixture with 15 grams of CaO (provided as 164 milliliters of an aqueous solution thereof, in a concentration of 91.6 g/l. of CaO). This reaction employed 15 wt. % of CaO and 9 wt. % ozone, the foregoing based on the lignosulfonate solids present. The reaction temperature was 50° C. to 70° C.

The resulting solution had a pH of 11.4; a solids concentration of 26 percent and 113.5 grams of said solids. To this solution was added, in turn, 18 milliliters of water to reduce the solids concentration of the solution to 25 percent by weight.

The foregoing solution was introduced into the ozone treatment apparatus wherein the desired reaction time of 117 minutes was first determined and other reaction conditions rendered substantially constant; and the apparatus swept with oxygen. Thereafter 113 ml. of water was added and the alkaline condition of the reaction mixture sustained during ozonization.

The ozone employed in oxidation of the foregoing lignosulfonate composition was formed from oxygen on a corona discharge dielectric supplied with a line voltage of 120 volts that was transformed to about 19,000 volts at the dielectric. The power of the dielectric was held within the range of 197 to 207 watts. The ozone charged into contact with the lignosulfonate was effected at a flow rate of 1.65 liters per minute of oxygen indicated (1.5 l/m. actually). The reaction temperature was similar to that of Example 5. The oxygen pressure at the dielectric was 8 psi. The reaction was sustained for the projected period, as indicated, at an alkaline pH which at the conclusion of the reaction had been reduced to 9.7. The yield of product, an aqueous solution of lignosulfonate with a calculated solids content of 21.2 percent (principally ozonated calcium salt of lignosulfonate) incorporated 9 percent by weight of ozone.

EXAMPLE 7

The process of Example 6 was repeated using 179 grams of the calcium hardwood sugar-destroyed lignosulfonate, NORLIG 41S-2 (having a solids content of 100 grams) provided from an aqueous solution thereof in a weight ratio of 50 percent. To this was added 32 grams of a 50 weight percent solution of sodium hydroxide (16 grams NaOH) to provide a reaction mixture having a pH of 12.2. An additional 50 grams of water were introduced into this solution. Nine grams of ozone were passed through the foregoing reaction mixture in the ozone treatment apparatus over a period of 146 minutes at a reaction temperature of from about 49° C. to 60° C. The alkaline condition of the reaction mixture was sustained during ozonization and was 8.6 at conclusion of the reaction. The treatment apparatus was initially swept with oxygen. The ozone was formed as described in Example 6. The power of the dielectric was held within the range of 198 to 202 watts. The flow rate of ozone was indicated to be 1.65 liters per minute during the reaction. The yield of product 516 grams of an aqueous solution of lignosulfonate had a calculated solids content of 113 grams or 45.4 weight precent (principally ozonated calcium salt of hardwood sugar-destroyed lignosulfonate).

EXAMPLE 8

The process of Example 6 was repeated using the lignosulfonate of Example 6 in the same amount and adding thereto 50 grams of water and 10 grams of CaO (as 109 mil. of 91.6 g/liter of CaO). To this reaction mixture was added 80 ml. of HOH to 30 percent of the original concentration. The pH of the resulting mixture was 11.17 prior to ozonation. The treatment apparatus was swept initially with ozone and oxygen. The ozone was formed in the manner Example 6, the power of the dielectric varying within the range of 200 to 205 watts. The reaction was sustained for a period of 85 minutes at an alkaline pH concluding with a pH of 8.3. The yield of product, 500 grams of ozonized lignosulfonate was calculated to contain 23.2 weight percent (116 grams) solids.

EXAMPLE 9

The process of Example 8 is repeated adding ½ of the CaO base at the commencement of the ozonization and ½ during the ozonization process to monitor fluidity and prevent O$_3$ blow-by.

EXAMPLE 10

An aqueous solution (263) grams) of the sodium salt of sulfomethylated lignosulfonate-containing sulfite waste liquor from which simple sugars have been removed, and present in a solids content of 38 percent by weight (100 grams), was admixed with 20 grams of a fifty percent aqueous solution of sodium hydroxide.

The foregoing solution was introduced into contact with conventional ozone treatment apparatus wherein the desired reaction time of 85 minutes was first determined; and other reaction conditions rendered substantially constant; and the apparatus swept with oxygen.

A concentration of 10 percent of ozone by weight of lignosulfonate-containing solids was charged to the apparatus containing the foregoing solids. Specifically, the ozone employed in oxidation of the foregoing lignosulfonate composition was formed from oxygen on a corona discharge dielectric supplied with a line voltage of 120 volts that was transformed to 19,000 volts at the dielectric. The power of the dielectric was held within the range of 200 to 205 watts. The ozone at optimum production was contained in a total gas flow of about 3.27 indicated (2.5 actual) liters per minute. Of this flow, about 1.8 indicated (1.5 actual) liters per minute containing ozone at a flow rate concentration of 0.1172 grams per minute was charged to the reactor for the projected period of 85 minutes at a pH of 11.5 to 9.1; the latter pH occurring at the conclusion of the reaction. The latter pH was also that of the product. The reaction temperature was varied from 43° C. 60° C. Off-gas from the reactor consisting only of oxygen was vented. The remainder of the total gas stream containing ozone at a flow-rate of 1.46 indicated (1.0 actual) liters per minute was passed through an ozone destruction trap and vented. The yield of product, an aqueous solution, contained 29.0 weight percent solids, wherein the solids (110 grams) constituted the ozonated sodium salt of sulfomethylated lignosulfonate.

EXAMPLE 11

An aqueous solution of the calcium salt of sulfomethylated concentrated sulfite waste liquor incorporating simple sugars, polysaccharides and lignosulfonates and having a pH of 2.9 (179 grams), and a solids content of sulfite waste liquor of 56 percent by weight (100 grams) was admixed with 32 grams of sodium hydroxide dissolved in a fifty percent aqueous solution; to which fifty additional grams of water were added to provide a composition having a pH of 12.2.

The foregoing solution was introduced into contact with a 10 percent concentration of ozone by weight of lignosulfoante containing-solids. The desired reaction conditions and constancy of those conditions during the term of the reaction were determined initially; and the apparatus in which the reaction took place swept with oxygen.

The ozone was secured from treatment of oxygen on a corona discharge dielectric, as described hereinabove in connection with Example 10, the power employed varying within a range of 198 watts of 202 watts. The line voltage and that maintained at the dielectric were identical to those recited in Example 10.

Ozone at optimum production was contained in a total gas flow of about 3.27 indicated (2.5 actual) liters per minute. Of this flow about 1.85 indicated (1.5 actual) liters per minute, containing ozone at a flow rate concentration of 0.1111 grams per minute, was charged to the reactor for a period of 81 minutes at the end of which time the reaction was completed. The pressure at the generating dielectric was 9 psi. The ozonated product, ozone oxidized calcium sulfomethylated lignosulfonate incorporated in a concentration sulfite waste liquor, was obtained in a yield of 113 grams in an alkaline aqueous solution having a pH of 8.6, and totalling 248 grams, the lignosulfonate-containing product providing a solids content therein of 45.4 percent by weight.

EXAMPLE 12

An unneutralized aqueous solution of a calcium lignosulfonate-containing softwood spent sulfite liquor, the soluble organic fraction resulting from acid sulfite pulping of wood and containing 49.2 percent by weight of said solution of solids, and from which, in addition, the reducing sugars were removed by yeast fermentation, was acquired from the St. Regis Paper Company and divided into six samples which were left untreated, oxidized, or rendered alkaline and thereafter ozonated as described hereinafter. The resulting compositons has the pH in each instance recited in Table I of this Example 12 wherein the resulting calcium salt solution of Run 1 was not further treated, but preserved as a control sample; the corresponding calcium salt solution of Run 2 was oxidized with 0.3 percent by weight of ozone; the aqueous calcium salt solution of Run 3 was oxidized with 0.3 percent weight of oxygen to provide a sample otherwise similar to that of Run 2 and to serve as a further control with respect thereto; and the aqueous solutions of Runs 4, 5 and 6 were treated with 7 percent, 12 percent and 20 percent by weight in each instance, of sodium hydroxide respectively, and ozonated with 2 percent, 5 percent and 12 percent by weight respectively of ozone according to the invention.

Five grams of each of said samples were then dissolved in 100 cubic centimeters of water, and 5 cubic centimeters of each of the six sample solutions as prepared were then each mixed with 290 grams of an aqueous slurry containing 118.9 grams of pulverized ASP-200 Stellar Clay (purchased from the Engelhard Mineral and Chemical Company) for an effective clay concentration of 41 percent by weight in each instance. The pH of the clay was maintained at 5 during the test. The solids concentration of TORANIL dispersant in each of the foregoing samples was 0.25 grams equivalent of 0.2 percent by weight based on the amount of clay solids present; the foregoing samples were then evaluated as dispersants employing a standard test procedure wherein the samples were introduced into a Fann Rotational Viscosimeter obtained from the Fann Instrument Company of Houston, Tex. Values for viscosity and yield point calculated from 600°, 300°, 200°, 100°, 6° and 3° Fann settings were secured as recited in Table I hereinbelow:

TABLE I

| RUN | I | II | III | IV | V | VI |
|---|---|---|---|---|---|---|
| | | Ca TORANIL | | | | |
| Dispersant | un-treated | .3% O₃ | .3% O₂ | 7% NaOH 2% O₃ | 12% NaOH 5% O₃ | 20% NaOH 12% O₃ |
| pH* of Dispersant | 4.4 | 4.1 | 4.2 | 9.9 | 10.7 | 9.5 |
| Apparent Viscosity** | 101 | 100 | 99 | 75 | 62 | 53 |
| Plastic Viscosity | 26 | 28 | 26 | 22 | 20 | 19 |
| Yield point*** | 150 | 144 | 146 | 106 | 84 | 67 |
| RUN | | | | | | |
| °Fann 600 | 202 | 200 | 198 | 150 | 124 | 105 |
| 300 | 176 | 172 | 172 | 128 | 104 | 86 |
| 200 | 171 | 168 | 167 | 124 | 100 | 84 |
| 100 | 156 | 154 | 153 | 112 | 87 | 74 |
| 6 | 89 | 88 | 89 | 70 | 58 | 47 |
| 3 | 73 | 72 | 75 | 60 | 54 | 45 |

*pH after ozonation or oxidation (where employed) has been completed
**Values in centipoises
***Values in pounds per 100 square feet It will be evident that the ozonated additives of the invention treated in alkaline media as shown in Runs 4, 5 and 6 of this Example have a significantly better dispersant activity as evidenced by the surface activity imparted to the slurried products of these runs and the viscosity and yield point values reflective thereof as recited in Table I hereinabove in contrast to the significantly higher values evidenced for reduced concentrations of ozone effected in acid media (Run 2 of Table I); and that not only is the ozonated composition produced in Run 2 significantly less effective as a dispersant, as evidenced by these tests, but the surface activity thereof is substantially unchanged from that of calcium lignosulfonate-containing spent sulfite liquor which is oxidized but non-ozonated (Run 3) or unoxidized (Run 1).

The intrinsic excellent properties and general superiority of products made in accordance with the present invention are thus easily discernible and plainly evident from the foregoing exemplifications and illustrations.

The ozone oxidized lignosulfonate products obtained by present practice are all found to be extremely useful and effective as improved dispersing agents for dyestuffs, clays and so forth and in and for ceramic refractory preparations; as well as for the emulsification of oils and various petroleum products and, additionally in many instances, as valuable and highly efficacious retarding agents for oil well cement compositions to control and regulate the setting thereof under high temperature and pressure conditions even in highly saline aqueous environments.

Similar very good results, using appropriate reagents for the purpose, are realized when the ozone oxidized products are made by first additionally sulfonating a given lignosulfonate or resulfonating a desulfonated lignosulfonate prior to ozone oxidation and/or, obversely, after-sulfonating an already ozone oxidized lignosulfonate material of any of the above-described types and varieties using, in and for the sulfonation aspect, direct non-alkyl-group-containing sulfonations as well as sulfomethylations, sulfoethylations, sulfopropylations and so forth.

Many changes and modifications can readily be made and adapted in embodiments in accordance with the present invention without substantially departing from its apparent and intended spirit and scope, all in pursuance and accordance with the same as set forth and defined in the hereto appended claims.

What is claimed is:

1. An ozonated composition comprising a lignosulfonate that has been subjected to ozone oxidation in an aqueous alkaline solution;
   said lignosulfonate being first incorporated in an aqueous dispersion containing between about 10 percent and 60 percent by weight of solids;
   said dispersion then having incorporated therein a base in an amount of at least 1 percent by weight of said lignosulfonate to form said alkaline solution prior to ozone oxidation;
   said lignosulfonate containing between 2 percent and 20 percent by combined oxygen after ozone oxidation by weight of said ozone oxidized lignosulfonate;
   said lignosulfonate containing between about 0.5 percent and about 15 percent, based on total unoxidized lignosulfonate, of sulfonic sulfur calculated as sulfur;
   said ozone oxidized lignosulfonate including, as its oxidized units, carboxylic and phenolic moieties.

2. An ozonated composition as claimed in claim 1, wherein said composition contains about 5 percent to about 10 percent of combined oxygen.

3. An ozonated composition as claimed in claim 1, wherein said lignosulfonate is a partially desulfonated alkaline oxidized, hydrolyzed, and sequentially resulfonated lignosulfonate.

4. An ozonated composition as claimed in claim 1, wherein said base contains an alkaline earth metal or an alkali metal or mixtures thereof.

5. An ozonated composition as claimed in claim 4, wherein said base is a hydroxide.

6. An ozonated composition as claimed in claim 5, wherein said hydroxide is calcium hydroxide or sodium hydroxide.

7. An ozonated composition as claimed in claim 1, wherein said sulfonic sulfur is present in combined form with said lignosulfonate in the form of units of the formula:
   $-(CH_2)_xSO_3H$, wherein x has a numerical integral value of from 0 to 3 inclusive.

8. An ozonated composition as claimed in claim 7, wherein said sulfonic sulfur is present as the sulfonic group of the formula $-SO_3H$.

9. An ozonated composition as claimed in claim 7, wherein said sulfonic sulfur is present as a sulfomethyl group of the formula $-CH_2SO_3H$.

10. An ozonated composition as claimed in claim 7, wherein said sulfonic sulfur is introduced into said lignosulfonate to constitute 1.5 percent to 15 percent by weight of said lignosulfonate in its unoxidized state, by after-sulfonation of said previously ozone oxidized lignosulfonate.

11. An ozonated composition as claimed in claim 10, wherein said after-sulfonation is accomplished in an aqueous reaction mass at a temperature between about 40° C. and 200° C. using as the resulfonation reagent an aldehyde of the formula:
   $RCH:O$, wherein R is a hydrogen or an alkyl group containing from 1 to 2 carbon atoms in approximately stoichiometric admixture with a sulfite of the formula:
   $XHSO_3$, wherein X is an alkali metal.

12. An ozonated composition as claimed in claim 10, wherein
   said aldehyde is formaldehyde and said sulfite is sodium bisulfite; and
   wherein said temperature is at least about 100° C. for a period of from 0.5 hour to about 16 hours.

13. An ozonated composition as claimed in claim 4, wherein said base is present in an amount of from about 10 percent to 15 percent by weight of said lignosulfonate.

14. An ozonated composition as claimed in claim 13, wherein said base is present in an amount of about 13 percent.

15. An ozonated lignosulfonate composition consisting essentially of
   a lignosulfonate that has been subjected to ozone oxidation in an aqueous alkaline solution at a temperature within the range of 0° C. to 80° C. for a period of at least 30 minutes by means of a continuous ozone feed to said lignosulfonate;
   said aqueous alkaline solution of lignosulfonate having been formed from an aqueous dispersion of said lignosulfonate containing from about 10 percent to 60 percent by weight of solids to which a base is added;
   said ozone feed comprising a gaseous composition composed of oxygen or air and containing from 0.1 percent to 5 percent by weight of ozone;
   said ozonated lignosulfonate containing, by weight, between 2 percent and 20 percent of total added combined oxygen in the oxidized lignosulfonate product;
   said composition being further characterized by substantially complete solubility in aqueous saline solution.

16. An ozonated oxidized composition as claimed in claim 15, wherein said ozone oxidation takes place at a temperature of from 20° C. to 50° C. for a period of 2 to 7 hours.

17. An ozone oxidized composition as claimed in claim 16, wherein the concentration of ozone in said feed is within the range of 2 percent to 3 percent by weight of said gaseous composition.

18. An ozone oxidized composition as claimed in claim 17, wherein said aqueous alkaline medium has a pH of about 14.

19. The method of making ozonated lignosulfonate comprising:
admixing lignosulfonate starting material with water and an alkaline reagent, the latter in a concentration of at least 1 percent, based on the weight of said starting material and water;
and contacting the resulting mixture with ozone to effect ozone oxidation of said lignosulfonate; and continuing said contact until the ozone take-up of the lignosulfonate as oxidized units added thereto during ozonization is between about 2 percent and about 20 percent, based on the weight of the ozone oxidized lignosulfonate product.

20. The method of claim 19, wherein said ozone is present in an air or oxygen carrier in a concentration therein of between about 0.1 percent and about 4 percent.

21. The method of claim 19, wherein said ozone is present in a concentration of from about 2 percent to about 3 percent.

22. The method of claim 19, wherein ozone oxidation is conducted for a period of between about ½ hour to about 16 hours.

23. The method of claim 19, wherein the ozone take-up is between about 5 percent and about 10 percent.

24. The method of claim 19, wherein the lignosulfonate starting material comprises an alkaline oxidized, hydrolyzed, partially desulfonated lignosulfonate in an aqueous dispersion containing between about 10 weight percent and about 60 weight percent of dispersed lignosulfonate solids.

25. The method of claim 19, wherein said alkaline reagent is sodium hydroxide or calcium hydroxide.

26. The method of claim 19, wherein the lignosulfonate starting material contains between about ½ percent and about 15 percent, based on total unoxidized lignosulfonate solids weight, of organic sulfonic sulfur calculated as sulfur.

27. The method of claim 26, wherein said lignosulfonate starting material contains between about 1½ percent and about 10 percent of organic sulfur.

28. The method as claimed in claim 19, including in addition thereto and in combination therewith:
the additional step of introducing into the ozone oxidized lignosulfonate product by after-sulfonation to make up between about 1½ weight percent and about 15 weight percent of total sulfur in combined organic sulfonic sulfonate form, based on the weight of the resulting composition, of units of the formula:
$(-CH_2)_x-SO_3H$, wherein x has a numerical integral value from 0 to 3.

29. The method of claim 28, wherein the resulfonation units are sulfonyl radicals of the formula $-SO_3H$.

30. The method of claim 28, wherein said sulfoalkyl groups are sulfomethyl groups.

31. The method of claim 28, wherein said after-sulfonation is accomplished in an aqueous reaction mass at a temperature between about 50° C. and 200° C. using as the resulfonation reagent an aldehyde of the formula:
RCH:O, wherein R is hydrogen or an alkyl group containing from 1 to 2 carbon atoms in approximately stoichiometric admixture with a sulfite of the formula:
$XHSO_3$, wherein X is an alkali metal.

32. The method of claim 31, wherein said aldehyde is formaldehyde and said sulfite is sodium bisulfite; and
said temperature is at least about 100° C. for a period of from about ½ hour to about 16 hours.

33. The method of claim 19, wherein said ozone oxidation is conducted at a temperature within the range of 0° C. to 80° C.

34. The method of producing an ozone oxidized lignosulfonate comprising:
contacting a lignosulfonate dispersed as solids in an aqueous medium in an amount by weight of from 10 percent to 60 percent and in which there is incorporated additionally a base in an amount of at least 1 percent based on the solids content in said dispersion
with ozone sufficient to effect oxidation of said lignosulfonate and effect an increase in weight of said lignosulfonate of from 2 percent to 20 percent.

35. The method of claim 34, wherein said lignosulfonate-containing, alkaline aqueous medium contains from 1 percent by weight of alkali to the maximum soluble concentration of alkali therein.

36. The method of claim 35, wherein said alkali is present in an amount by weight of from about 10 percent to about 15 percent.

37. The method of claim 36, wherein said alkali is present in an amount by weight of about 13 percent.

38. The method of claim 33, wherein the temperature at which ozone oxidation is effected is between about 20° C. and 50° C.

39. The method of claim 33, wherein said temperature is between about 40° C. and 50° C.; and
said ozone oxidation is conducted for a period of from about 2 hours to about 7 hours.

* * * * *